US012675888B2

(12) United States Patent
Yoon et al.

(10) Patent No.: US 12,675,888 B2
(45) Date of Patent: Jul. 7, 2026

(54) METHOD AND APPARATUS FOR NODE-BASED MOTION ESTIMATION IN CARDIAC CT IMAGING

(71) Applicants: iTOMOGRAPHY CORPORATION, Houston, TX (US); THE UNIVERSITY OF CENTRAL FLORIDA RESEARCH FOUNDATION, Inc., Orlando, FL (US); CANON KABUSHIKI KAISHA, Tokyo (JP)

(72) Inventors: Seongjin Yoon, Houston, TX (US); Alexander Katsevich, Oviedo, FL (US); Michael Frenkel, Houston, TX (US); Qiulin Tang, Vernon Hills, IL (US); Liang Cai, Vernon Hills, IL (US); Jian Zhou, Vernon Hills, IL (US); Zhou Yu, Vernon Hills, IL (US)

(73) Assignees: iTOMOGRAPHY CORPORATION, Houston, TX (US); THE UNIVERSITY OF CENTRAL FLORIDA RESEARCH FOUNDATION, Inc., Orlando, FL (US); CANON KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 18/424,310

(22) Filed: Jan. 26, 2024

(65) Prior Publication Data

US 2024/0257361 A1 Aug. 1, 2024

Related U.S. Application Data

(60) Provisional application No. 63/481,721, filed on Jan. 26, 2023.

(51) Int. Cl.
| | |
|---|---|
| *G06T 7/62* | (2017.01) |
| *G06T 7/246* | (2017.01) |
| *G06T 12/30* | (2026.01) |

(52) U.S. Cl.
CPC ............... *G06T 7/248* (2017.01); *G06T 7/62* (2017.01); *G06T 12/30* (2026.01); (Continued)

(58) Field of Classification Search
CPC .......... G06T 7/248; G06T 7/62; G06T 12/30; G06T 2207/10081; G06T 2207/20021; (Continued)

(56) References Cited

U.S. PATENT DOCUMENTS

| | | | |
|---|---|---|---|
| 10,565,744 B2 * | 2/2020 | Lee ......................... G06T 12/00 |
| 2012/0294427 A1 * | 11/2012 | Grady .................... A61B 6/481 |
| | | | 378/95 |

(Continued)

OTHER PUBLICATIONS

Isola, A. et al., "Fully Automatic Nonrigid Registration-Based Local Motion Estimation for Motion-Corrected Iterative Cardiac CT Reconstruction", Medical Physics, vol. 37, No. 3, 2010, pp. 1093-1109.

(Continued)

*Primary Examiner* — Ali Bayat
(74) *Attorney, Agent, or Firm* — Oblon, McClelland, Maier & Neustadt, L.L.P.

(57) ABSTRACT

A method for motion estimation in CT systems is provided. The method includes dividing projection data, obtained by scanning a heart using the CT system, into a plurality of partial-angle-reconstruction (PAR) bins, reconstructing a plurality of PAR volumes from the PAR-binned projection data, obtaining, based on the plurality of reconstructed PAR volumes, a number of short-scan volumes, determining, based on the obtained number of short-scan volumes, a plurality of nodes throughout the heart, estimating, for each of the determined plurality of nodes, a plurality of model (Continued)

parameters of a motion model, and generating, based on the plurality of model parameters estimated for each of the plurality of nodes, parameters of a global motion model at each voxel of a volume of the heart. The method also includes reconstructing, based on the generated motion parameters of the global motion model at each voxel of the volume of the heart, a motion-compensated short-scan volume.

16 Claims, 16 Drawing Sheets

(52) U.S. Cl.
CPC .............. *G06T 2207/10081* (2013.01); *G06T 2207/20021* (2013.01); *G06T 2207/30048* (2013.01); *G06T 2207/30101* (2013.01); *G06T 2210/41* (2013.01)

(58) Field of Classification Search
CPC . G06T 2207/30048; G06T 2207/30101; G06T 2210/41; G06T 12/10; G06T 2211/412; G06T 2211/436
USPC .......................................................... 382/107
See application file for complete search history.

(56) References Cited

U.S. PATENT DOCUMENTS

| | | | | |
|---|---|---|---|---|
| 2017/0340287 | A1* | 11/2017 | Fulton | A61B 5/721 |
| 2019/0261940 | A1* | 8/2019 | Son | A61B 6/032 |
| 2019/0328341 | A1* | 10/2019 | Katsevich | A61B 6/032 |
| 2020/0163639 | A1* | 5/2020 | De Man | G06N 3/084 |
| 2023/0097836 | A1* | 3/2023 | Ota | G06T 12/10 |
| | | | | 382/131 |

OTHER PUBLICATIONS

Tang, Q. et al., "A fully Four-Dimensional, Iterative Motion Estimation and Compensation Method for Cardiac CT", Medical Physics, vol. 39, No. 7, 2012, pp. 4291-4305.
Kim, S. et al., "Cardiac Motion Correction Based on Partial Angle Reconstructed Images in X-Ray CT", Medical Physics, vol. 42, No. 5, 2015, pp. 2560-2571.
Rohkohl, C. et al., "Improving Best-Phase Image Quality in Cardiac CT by Motion Correction with MAM Optimization", Medical Physics, vol. 40, No. 3, 2013, 15 pages.
Tang, Q. et al, "Four-Dimensional Projection-Based Motion Estimation and Compensation for Cardiac X-Ray Computed Tomography", 12th International Meeting on Fully Three-Dimensional Image Reconstruction Radiology and Nuclear Medicine, 2013, pp. 46-49.
Extended European Search Report issued Jun. 26, 2024, in corresponding European Patent Application No. 24154238.0, 7 pages.
Jed D. Pack et al., "Four-dimensional computed tomography of the left ventricle, Part I: Motion artifact reduction", Medical Physics, vol. 49, No. 7, Jul. 15, 2022, pp. 4404-4418, XP093175830.

* cited by examiner

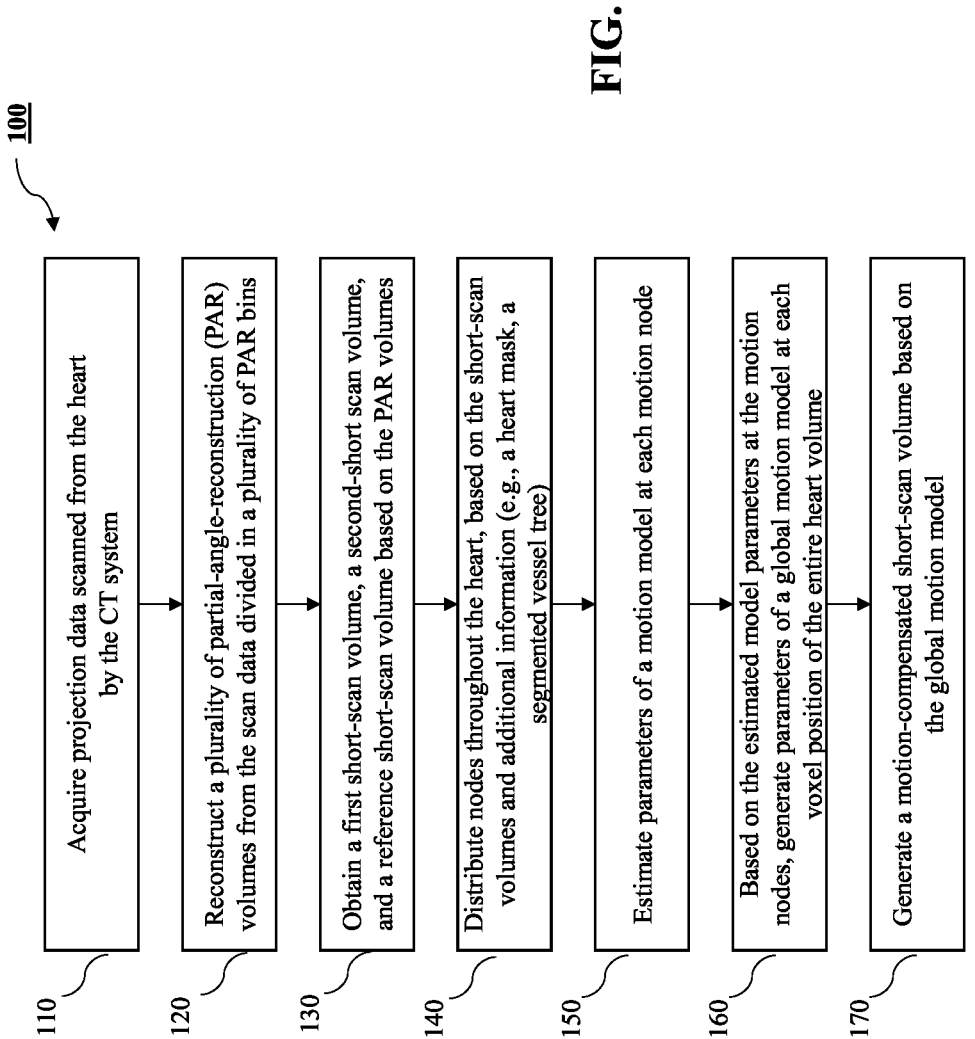

100

110  Acquire projection data scanned from the heart by the CT system

120  Reconstruct a plurality of partial-angle-reconstruction (PAR) volumes from the scan data divided in a plurality of PAR bins 130  Obtain a first short-scan volume, a second-short scan volume, and a reference short-scan volume based on the PAR volumes 140  Distribute nodes throughout the heart, based on the short-scan volumes and additional information (e.g., a heart mask, a segmented vessel tree)

150  Estimate parameters of a motion model at each motion node

160  Based on the estimated model parameters at the motion nodes, generate parameters of a global motion model at each voxel position of the entire heart volume 170  Generate a motion-compensated short-scan volume based on the global motion model

FIG. 1

Reconstructable zone: scan extent where there is enough projection data for short-scan reconstruction as long as the short-scan center is anywhere in this region.

scan start scan end half of short-scan extent vertical arteries (24, 24, 16)

horizontal arteries (53, 53, 26)

other regions (walls) (64, 64, 32)

METHOD AND APPARATUS FOR NODE-BASED MOTION ESTIMATION IN CARDIAC CT IMAGING

CROSS-REFERENCE TO RELATED APPLICATIONS

The present application claims priority to Provisional Application No. 63/481,721, filed Jan. 26, 2023, the contents of which are incorporated herein in their entirety.

FIELD

The present application relates to a method and apparatus for motion estimation used in computed tomography (CT) imaging systems. More specifically, the application relates to node-based motion estimation and motion compensation in cardiac CT imaging.

DESCRIPTION OF THE RELATED ART

Computed tomography (CT) imaging is a promising non-invasive technique for early detection of cardiovascular diseases. However, image quality in CT scans of the heart is affected by heart motion, especially with fast heartbeats. Although some advanced scanners can achieve good image quality with moderate heartbeats, motion artefacts are often present in cardiac scans with heart rates more than 60 bpm, for example.

Four-dimensional-image-based motion estimation and motion compensation can be developed to reduce motion artifacts. See, e.g., A. A. Isola, M. Grass, and W. J. Niessen, Fully Automatic Nonrigid Registration-Based Local Motion Estimation for Motion-Corrected Iterative Cardiac CT Reconstruction, *Med. Phys., vol.* 37, no. 3, pp. 1093-1109, February 2010; see also Q. Tang, J. Cammin, S. Srivastava, and K. Taguchi, A fully Four-Dimensional, Iterative Motion Estimation and Compensation Method for Cardiac CT, *Med. Phys.*, vol. 39, no. 7, pp. 4291-4305, June 2012. However, the temporal resolution is limited by the image being used for motion estimation.

Partial-image-based motion estimation and motion compensation can also be used to improve temporal resolution. See, e.g., S. Kim, Y. Chang, and J. B. Ra, Cardiac Motion Correction Based on Partial Angle Reconstructed Images in X-Ray CT, *Med. Phys.*, vol. 42, no. 5, pp. 2560-2571, April 2015. The limitation of this type of method is that the motion estimation could be degraded by the partial reconstruction artefact in partial images.

Projection-based fully iterative motion estimation and motion compensation also can be developed to address the temporal resolution and partial angle artefacts issue, but it is very time consuming. See, e.g., C. Rohkohl, H. Bruder, K. Stierstorfer, and T. Flohr, Improving Best-Phase Image Quality in Cardiac CT by Motion Correction with MAM Optimization, *Med. Phys.*, vol. 40, no. 3, pp. 031901, March 2013; see also Q. Tang, J. Cammin, and K. Taguchi, Four-Dimensional Projection-Based Motion Estimation and Compensation for Cardiac X-Ray Computed Tomography, *Proc. 12th Int. Meeting Fully 3D Image Reconstruct Radiol. Nucl. Med.*, pp. 46-49, June 2013.

Thus, there is a need to alleviate the motion artifact issue and to enhance the image quality of cardiac CT imaging.

SUMMARY

An embodiment of present application is directed to a method for motion estimation in a CT system. The method includes dividing projection data, obtained by scanning a heart using the CT system, into a plurality of partial-angle-reconstruction (PAR) bins, reconstructing a plurality of PAR volumes from the PAR-binned projection data, obtaining, based on the plurality of reconstructed PAR volumes, a number of short-scan volumes, determining, based on the obtained number of short-scan volumes, a plurality of nodes throughout the heart, estimating, for each of the determined plurality of nodes, a plurality of model parameters of a motion model, and generating, based on the plurality of model parameters estimated for each of the plurality of nodes, parameters of a global motion model at each voxel of a volume of the heart.

Another embodiment of the present application is directed to an apparatus for motion estimation in a CT system. The apparatus includes processing circuitry that is configured to divide projection data, obtained by scanning a heart using the CT system, into a plurality of partial-angle-reconstruction (PAR) bins, reconstruct a plurality of PAR volumes from the PAR-binned projection data, obtain, based on the plurality of reconstructed PAR volumes, a number of short-scan volumes, determine, based on the obtained number of short-scan volumes, a plurality of nodes throughout the heart, estimate, for each of the determined plurality of nodes, a plurality of model parameters of a motion model, and generate, based on the plurality of model parameters estimated for each of the plurality of nodes, parameters of a global motion model at each voxel of a volume of the heart.

A further embodiment of present application is directed to a non-transitory computer-readable medium storing a program that, when executed by processing circuitry, causes the processing circuitry to execute a method for motion estimation in a CT system. The method includes dividing projection data, obtained by scanning a heart using the CT system, into a plurality of partial-angle-reconstruction (PAR) bins, reconstructing a plurality of PAR volumes from the PAR-binned projection data, obtaining, based on the plurality of reconstructed PAR volumes, a number of short-scan volumes, determining, based on the obtained number of short-scan volumes, a plurality of nodes throughout the heart, estimating, for each of the plurality of nodes, a plurality of model parameters of a motion model, and generating, based on the plurality of model parameters estimated for each of the plurality of nodes, parameters of a global motion model at each voxel of a volume of the heart.

BRIEF DESCRIPTION OF THE DRAWINGS

The application will be better understood in light of the description, which is given in a non-limiting manner, accompanied by the attached drawings in which:

FIG. 1 shows a non-limiting example of a flow chart of a motion estimation and motion compensation method 100 according to one embodiment of the present application;

DETAILED DESCRIPTION

Figure 2:
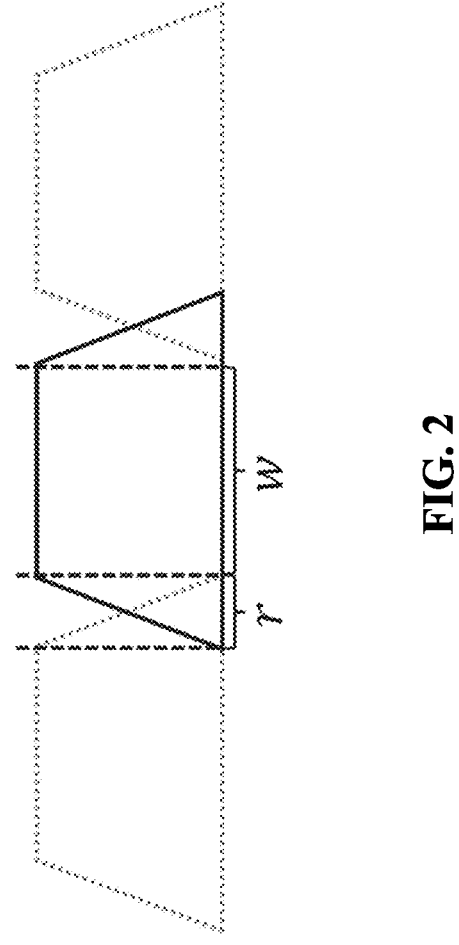
FIG. 2 shows an exemplary isosceles trapezoidal partition-of-unity weight used to smooth out transitions between the PAR volumes.

To overcome the above challenges, the present application provides a motion estimation and motion compensation method and apparatus. The method utilizes the idea of partial image reconstruction to improve temporal resolution, but avoids the partial angle artifact issue. Compared with other whole heart motion estimation methods, the method of this application can provide more accurate and more efficient motion estimation.

According to one embodiment of the application, the motion estimation method is based on finding motion near a plurality of nodes. The position of the nodes can be determined in an anatomically reasonable way. Advantageously, the method can utilize additional information, including but not limited to, a heart mask and a segmented coronary artery tree. Using the heart mask, the nodes can be distributed only inside the heart. For instance, the nodes can be placed at strong landmarks that exhibit motion and along the segmented coronary artery tree. Moreover, a node can be shifted if locally the artery is faint and there is a stronger feature nearby (e.g., a heart wall).

According to one embodiment of the application, the method performs motion estimation in an anatomically reasonable way, starting from nodes in the areas with small motion and progressively moving into areas of the heart with larger motion. To ensure motion model continuity, sequential warm-start motion estimation can be used. Parameters of the motion model at a given node can be estimated on the basis of parameters of the motion model estimated at a previous node. Thus, even though motion estimation is local, the method of the present application can make sure that the computed motion models vary smoothly in space.

Since motion estimation is purely local, necessary adjustments to the motion estimation algorithm can be incorporated in a natural way. For example, the cost functional to solve for the motion model can be adjusted depending on the orientation of the vessel where a node is located and/or on the image HU (Hounsfield Unit) values in a neighborhood of the node.

Advantageously, the method is computationally lightweight. Additionally, the method is sufficiently robust when problems such as unmixed contrast agent and air bubbles are present in the patient.

Embodiments or examples for implementing various aspects of the present application may be as set forth in the following sections. Specific examples of components and arrangements are described below to simplify the present application. These are, of course, merely examples and are not intended to be limiting.

FIG. 1 shows a non-limiting example of a flow chart of a motion estimation and motion compensation method 100 according to one embodiment of the present application. At step 110, projection data scanned from the heart by the CT system is acquired. At step 120, a plurality of partial-angle-reconstruction (PAR) volumes is reconstructed from the scan data divided in a plurality of PAR bins. At step 130, a first short-scan volume, a second short-scan volume, and a reference short-scan volume are obtained based on the PAR volumes. At step 140, a plurality of scattered nodes are distributed throughout the heart, based on the short-scan volumes and additional information such as a heart mask, a segmented vessel tree, etc. At step 150, parameters of a motion model are estimated with respect to each motion node. At step 160, parameters of a global motion model are generated at each voxel position of the entire heart volume, based on the estimated model parameters with respect to the motion nodes. At step 170, a motion-compensated short-scan volume is generated based on the global motion model.

The order of discussion of the different steps as described herein is presented for clarity's sake. In general, these steps can be performed in any suitable order. Additionally, although each of the different features, techniques, configurations, etc. herein may be discussed in different places of this application, it is intended that each of the concepts can be executed independently of each other or in combination with each other. Accordingly, the present application can be embodied and viewed in many different ways.

Furthermore, as used herein, the words "a," "an," and the like generally carry a meaning of "one or more," unless stated otherwise.

I. Partial Angle Reconstruction

According to one embodiment of the present application, the motion estimation and motion compensation process can be based on the Backproject-Warp-and-Add (BWA) method. Motion compensation (MC) can be implemented by any possible implementation means or manners in the related art. Motion estimation (ME) is critical to the ME-MC process of this application. During the motion estimation phase, multiple patches of intermediate motion compensated reconstructed volumes can be created.

The BWA reconstruction method creates a motion-compensated reconstructed volume by the following steps:

Step 1: Create multiple partial angle reconstruction (PAR) volumes by backprojecting scan data divided in multiple bins (also called "PAR bins" in this application).

Step 2: Warp each PAR volume by applying a motion model.

Step 3: Add the PAR volumes identified for a short scan view range to create a complete, motion compensated reconstruction.

According to one embodiment of the present application, firstly, the scan data is divided into multiple data bins. Then, a PAR volume is created for each data bin by backprojection. Other steps in the creation of PAR volumes (in addition to backprojection) which are well-known to those skilled in the art, are not detailed here. To smooth out transitions between the PAR volumes, every pair of adjacent bins can have some overlap, which is represented by a partition-of-unity weight.

FIG. 2 shows an exemplary isosceles trapezoidal partition-of-unity weight, where the shape is parameterized by the following factor:

$$\text{ramp\_width\_ratio} = 2r/(r+w).$$

Note that the partition-of-unity weight can have other shapes and can be designed in any possible ways in the related field.

Figure 3:
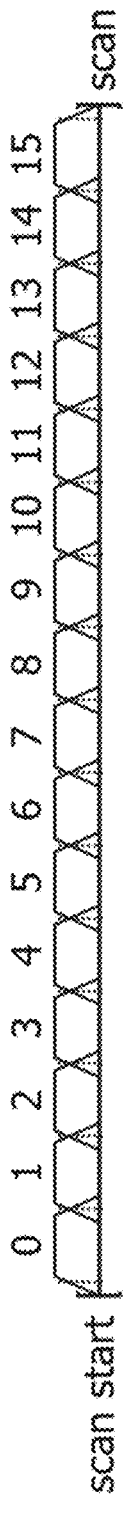
FIG. 3 shows an exemplary division where there are 16 equal-sized PAR bins.

In an exemplary division shown in FIG. 3, the entire scan range is subdivided into 16 equal-sized bins of width w and two ramp widths r (of the partition-of-unity weight) at the start and end of the scan data. In other words, r+16w+r equals to the scan length. The scan data can be divided into another number of bins. The number of the bins can be determined by the available computer memory. Depending on the extent of the valid scan data, each bin can be 25°-30° wide, for example.

The PAR volumes are reconstructed by back-projecting the PAR-binned data. During the back-projection of PAR reconstruction, the partition-of-unity weight is applied to each view. Then, the reconstructed PAR volumes are added for each short-scan extent.

Figure 4:
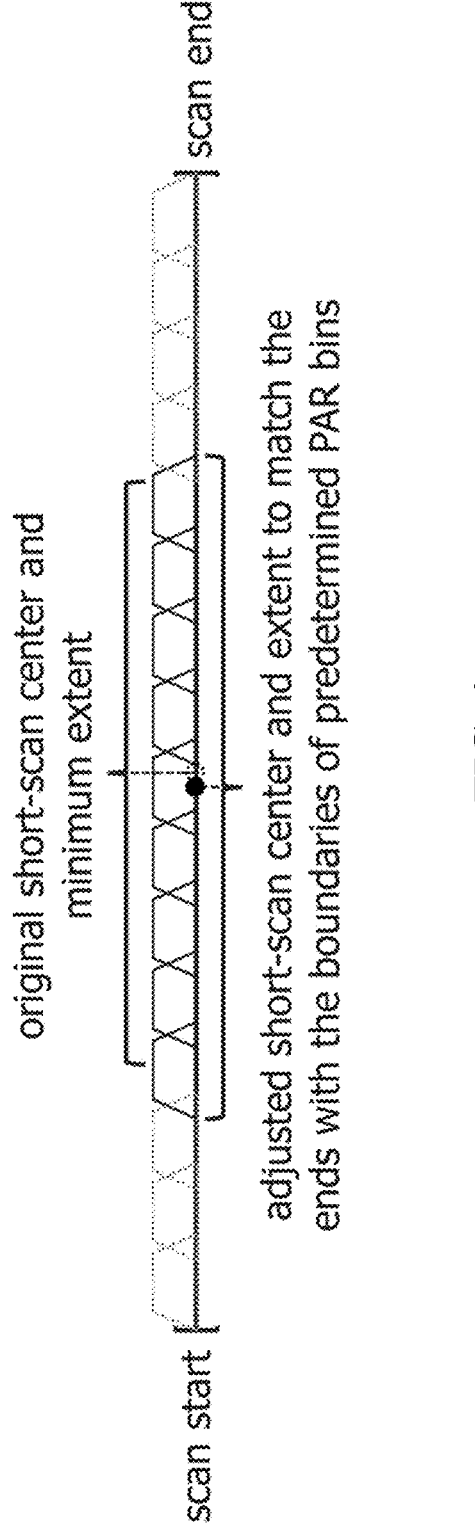
FIG. 4 shows a short-scan angular extent that is enlarged up to the boundaries of the PAR bins.

In one embodiment of the present application, the minimum angular extent of the short-scan is about 204°, which corresponds to 8-9 PAR bins. If the minimum short-scan extent starts or ends in the middle of a PAR bin, the short-scan angular extent can be slightly enlarged up to the boundaries of the PAR bins, as shown in FIG. 4. This is to ensure that the motion model and the redundancy weights described below can be applied most accurately for each PARs (although some discretization error is unavoidable).

Figure 5:
FIG. 5 shows a reconstructable zone within the range of the scan data.

FIG. 5 shows a reconstructable zone within the range of the scan data. The reconstructable zone is a scan extent where there is enough projection data for short-scan reconstruction, as long as the short-scan range center is anywhere in this region.

In one embodiment of the application, three short-scan (SS) reconstructed volumes, SS-0, SS-1, and SS-2, are created using the BWA method. SS-2 is the reference volume, which corresponds to the final result after motion compensation. The short scan range of SS-2 is centered at a "reference phase," where the motion is expected to be minimal.

Figure 6:
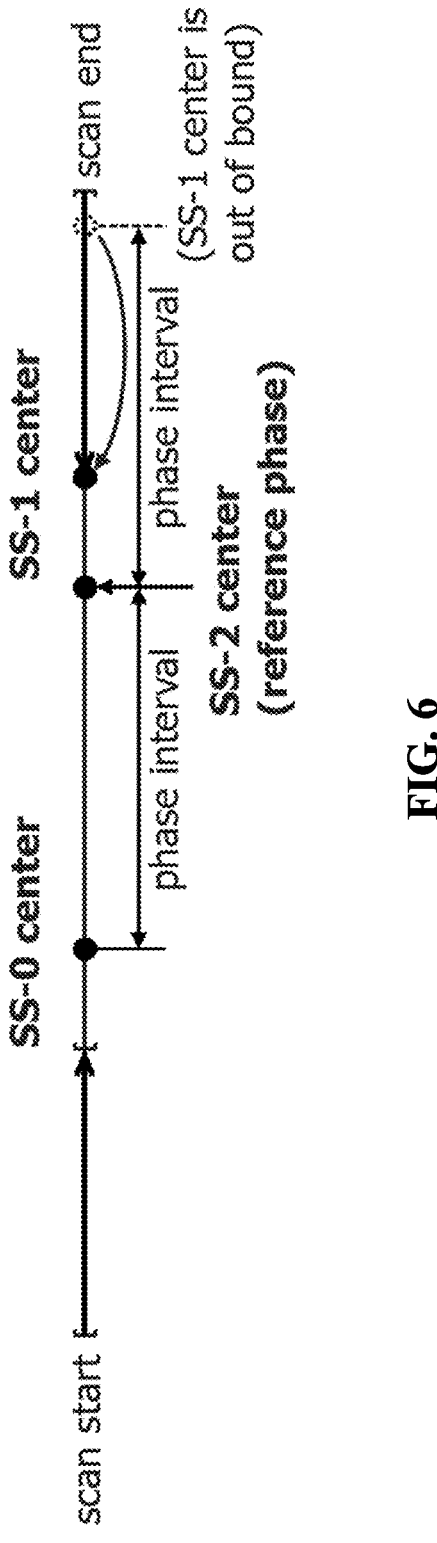
FIG. 6 shows an example of the centers of the short-scan ranges SS-0, SS-1, and SS-2.

The centers of the SS-0 and SS-1 intervals are placed a predetermined distance (this distance is called "phase interval" in FIG. 6) away from the reference phase. The angular extent of each SS interval is determined according to the well-known theoretical requirement for data completeness: 180°+fan angle. This determines the beginning and end of each SS interval. As shown in FIG. 6, when any of the SS-0 and SS-1 centers is outside the reconstructable zone, that center is moved to the nearest boundary of the reconstructable zone. These two short-scan reconstructed volumes are used to calculate volume similarity during motion estimation.

Figure 7:
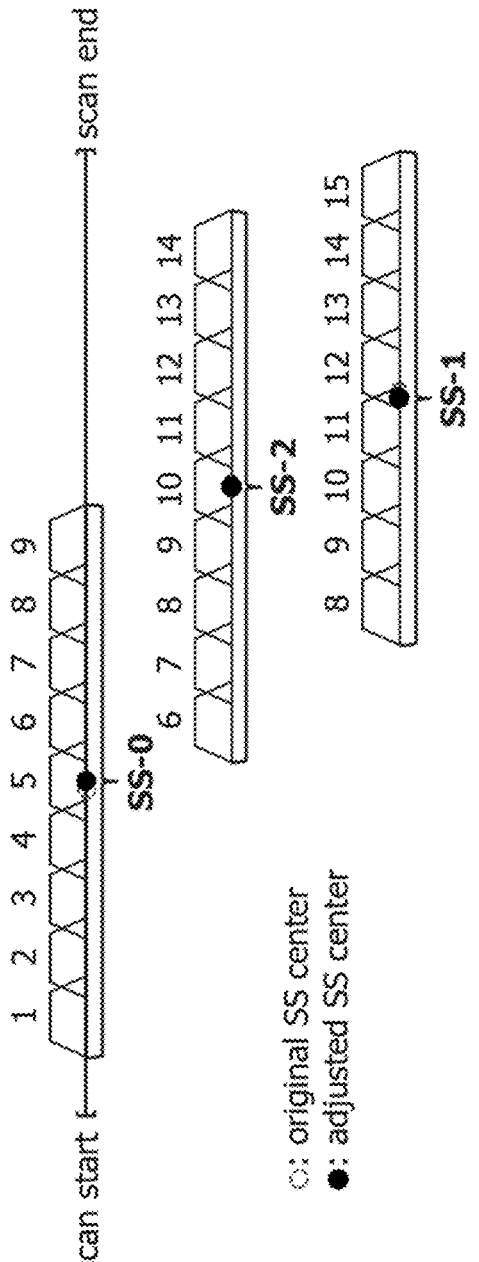
FIG. 7 shows an example of the short-scan ranges SS-0, SS-1, and SS-2.

FIG. 7 shows an example of the ranges of SS-0, SS-1, and SS-2. As shown in FIG. 7, the extents of SS-0, SS-1, and SS-2 can be adjusted to start and end exactly at the boundaries of PAR bins. SS-0, SS-1, and SS-2 can have the same numbers of bins. Alternatively, they can have different extents (±1 bin), which can be compensated for by redundancy weights in any possible ways in the related art.

For example, the following steps can be performed to reconstruct a volume for each of the short-scan ranges SS-0, SS-1, and SS-2:

Step 1: Identify the corresponding PAR bins that are within the required short-scan ranges SS-0, SS-1, and SS-2.

Step 2: Warp or shift each of the PAR volumes of the identified PAR bins using a motion model.

Step 3: Multiply each of the warped PAR volumes by its own redundancy weight.

Step 4: Add all the resulting PAR volumes together.

The redundancy weight and the parameters of the motion model used in Steps 2 and 3 with respect to each PAR volume are evaluated at the center phase of the corresponding PAR bin. The definition of the motion model and the estimation of the model parameters will be described in the following sections. Note that any PAR bin can be used for reconstructing one, two, or three different motion-compensated volumes from the list SS-0, SS-1, SS-2. The redundancy weight that this PAR bin receives depends on which of the three SS images are being reconstructed. For example, a given PAR bin may have redundancy weight 0.11 when it is used to reconstruct SS-0, and redundancy weight 0.12 when it is used to reconstruct SS-1.

II. Motion Model

Figure 8:
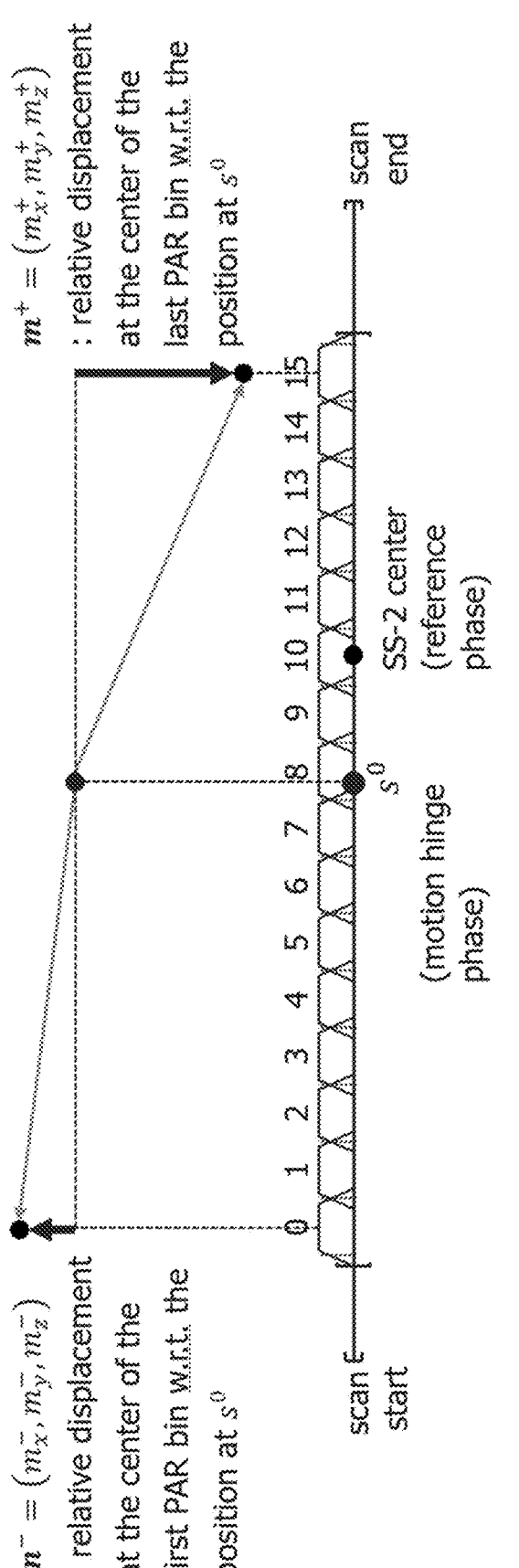
FIG. 8 shows a motion model that has seven parameters to describe motion at a motion node using a two-segment piecewise-linear function.

The entire motion of the heart can be described with the help of a set of scattered motion nodes. As shown in FIG. 8, each motion node can have seven parameters $$\left(s^0, m_x^-, m_y^-, m_z^-, m_x^+, m_y^+, m_z^+\right)$$

to describe the motion at the location using a two-segment piecewise-linear function.

The motion hinge phase $s^0$ is the hinge point of the piecewise-linear motion model. Each motion node has its own $s^0$, which is a parameter to be estimated. When $s^0$ is too close to the end of the valid scan region, motion displacement parameter estimation may become unstable. To avoid this, $s^0$ can be constrained to be within the extent of SS-2.

As mentioned in Section I, the reference phase is the center of SS-2. At the reference phase, velocity is expected to be the lowest within the scan duration. For the ME-MC framework of this application, the reference phase is known and constant.

Figure 9:
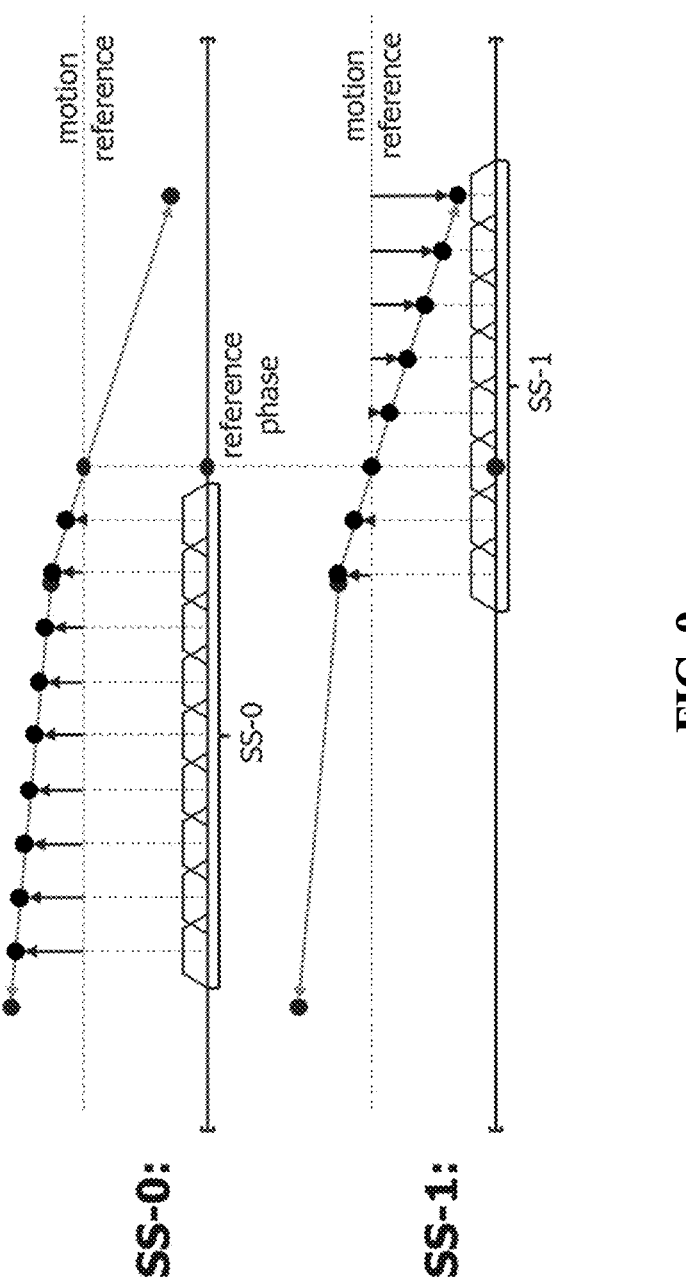
FIG. 9 shows the relative displacement at the center of each PAR bin evaluated with respect to the position at the reference phase.

FIG. 9 shows that the relative displacement at the center of each PAR bin is evaluated with respect to the position at the reference phase (not hinge phase $s^0$). In FIG. 9, the vertical solid arrows represent the displacements that correspond to individual PAR center phases with respect to reference phase.

In this application, two different types of motion models can be used for different tasks. A rigid-body motion model is used for motion estimation. This model is applied inside a local volume, called a patch, around each motion node. Different patches can have different motion models. An elastic motion model is used for motion compensation. This model is applied to the entire volume of the heart. The motion of each voxel is computed by interpolating motion models computed at the motion nodes. In other words, the rigid-body motion model is used to make the motion estimation at each node in an almost mutually independent manner. Once the motion parameters acquired with the rigid-body motion assumption are smoothly interpolated, an elastic motion model is thereby produced, and it can be used for motion compensation of the entire heart. Section VI below describes one possible method to perform this interpolation.

The distribution of the set of scattered motion nodes in the heart will be described in the following section.

III. Node Distribution

As mentioned above, a set of motion nodes scattered throughout the heart are used to represent the entire motion of the heart. Each node has a motion model determined by seven parameters as described in Section II. This involves two problems to solve:

Problem 1. The motion nodes should be assigned in an optimal way so that a minimum number of nodes can be used to accurately represent the global motion of the heart; and Problem 2. The motion nodes should be assigned only in regions where there are enough features (e.g., strong edges) to make the motion estimation robust.

For the purposes of node distribution, the motion nodes are classified into three types: artery nodes, other region nodes, and a starting node. Each node type can be distributed using a different method.

Cardiac arteries are the major concern of cardiac CT. Contrast-enhanced arteries also provide features required to estimate motion. Thus, the artery nodes will be distributed first, prior to distributing nodes of other two types. In an exemplary embodiment, the artery nodes can be distributed with a fixed distance along a vessel tree obtained by a vessel tree tracker. The tracked vessels are assumed to be sufficiently distinctive, so they can be used to estimate motion. Hence, no condition needs to be considered other than the distance between nodes. All of the found nodes can be added to an empty node list, leaving out the first slot for the starting node, which will be determined later.

An "other region" here means a general heart structure that does not belong to the tracked vessel tree, for example, an atrium, a heart wall, or any artery that is not identified by the vessel tree tracker. The other region nodes are applied only to those regions where a significant motion is present.

For example, to detect the significant motion, edges between uncorrected short-scan reconstructions SS-0, SS-1, and SS-2 can be compared. In this way, it can be detected whether a feature has moved during the scan time, without performing motion estimation.

More specifically, uncorrected reconstructions are performed for the three different short-scan ranges, SS-0, SS-1, and SS-2. Then, using Sobel edge detection, edge maps of SS-0, SS-1, and SS-2 can be developed.

Here, let the results be denoted $ES_0$, $ES_1$, and $ES_2$, respectively. Each dataset can have a different contrast level. The edge detection cutoff can be determined based on the median value of the Sobel filtered volume amplitude for each dataset. A 3D Gaussian filter can be applied to $ES_0$, $ES_1$, and $ES_2$ so as to broaden the edges and reduce the noise. Let the results be denoted $GES_0$, $GES_1$, and $GES_2$, respectively.

Then, the sum of edge differences squared is computed, and values are collected only when $GES_2$ is stronger:

$$DGES = \max(0, GES_2 - GES_0)^2 + \max(0, GES_2 - GES_1)^2.$$

Figure 16:
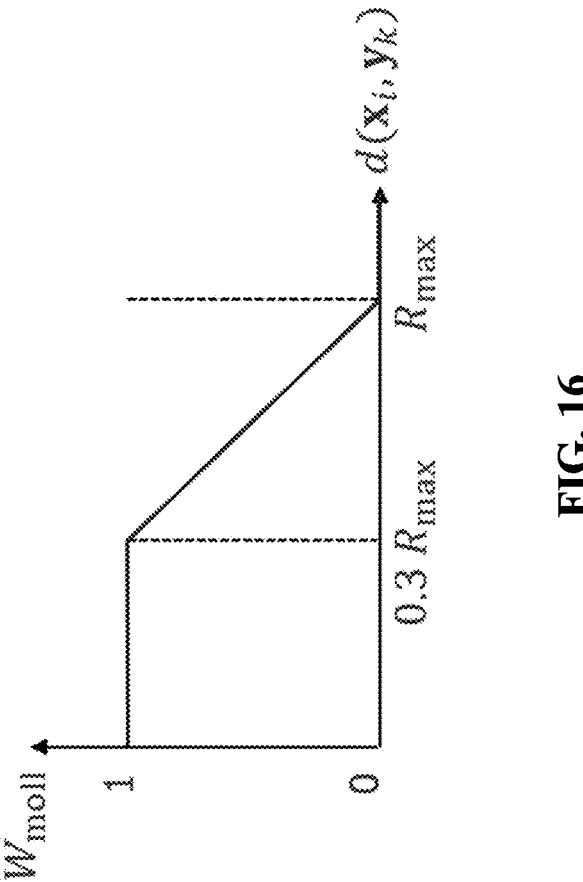
FIG. 16 shows an exemplary mollifier $W_{moll}$ that is a trapezoidal function of distance $d(x_i, y_k)$.

When locations are found where the value of DGES is smaller than a threshold, they can be saved as a "no-motion pixel map," which will be used to eliminate the need for extrapolation (and, therefore, use only interpolation) at the stage of creating a single global motion model from the plurality of the local motion models. In this application, "extrapolation" is vaguely defined as an interpolation to acquire the data that is far from any node. If a point is farther from the closest motion node than a threshold value, then the motion amplitude is gradually decreased as shown in FIG. 16, for example. In addition, if a voxel is within the "no-motion pixel map," no motion compensation is applied so as to avoid bones or any other hard tissues being distorted whenever they are too close to a motion node. A moving-average is applied to the DGES. The resulting volume is a motion heatmap, which indicates approximate significance of motion without knowing the direction and intensity of the motion.

After the position of the global maximum of the heat map is found, a node can be assigned to it. Then, the DGES values within a predefined radius from the newly assigned node can be set to zero to maintain the minimum distance between nodes (otherwise, nodes will be assigned too close to each other). This operation is repeated until the global maximum value becomes lower than a threshold, or the number of nodes reaches a predetermined maximum value.

In addition to the two types of motion nodes found above, a point in an anatomical area known to have small motion (e.g., less than a threshold) can be used as the starting node. For example, a point in a vicinity of the starting position of the right coronary artery ("RCA", near the aorta) can be identified where the motion is the smallest. This node will be used as the start of sequential motion estimation, where warm-start information is not available.

For example, the starting node can be assigned as follows:

Step 1: Identify all voxels in a neighborhood, e.g., a predefined 2D ellipse, in the transverse plane where the RCA starting position is located.

Step 2: Among the voxels identified in Step 1, pick voxels that have a $GES_2$ value higher than the threshold.

Step 3: Among the voxels identified in Step 2, assign the starting node to the voxel position that has the minimum motion heatmap value.

Once all node positions are identified, the other region nodes can be sorted for warm-start, as described in the following section.

IV. Warm-Start Sequence

Cardiac motion estimation may have multiple local minima. Most well-established global optimization methods fail to find the global minimum of this motion estimation problem. The exhaustive search method can be successful, but requires too many computational resources. The gradient descent method is faster, but does not always converge to the desired minimum.

To avoid undesirable local minima, the method according to the present application combines the gradient descent method with warm-start. To achieve the warm-start, the motion of each node is estimated one by one sequentially. With sequential motion estimation, the already estimated motion model at one node can be used as an initial solution for motion estimation at the next node in the sequence.

Thus, while motion estimation at each motion node proceeds largely independently, the order in which the nodes are processed is important for providing a proper starting point for gradient descent. In one embodiment of the application, the warm-start sequence can be created based on the shortest distance between neighboring nodes. The creation of the warm-start sequence starts with sorting of the existing nodes. For example, by the following Steps 1-5, the sorting operation can make the consecutive nodes in the sequence as spatially close as possible:

In Step 1, two lists of nodes, i.e., a sorted node list (SN) and an unsorted node list (USN), are created. The sorted node list (SN) contains the starting node and the artery nodes. The starting node should be the first node to be motion-estimated, and the artery nodes are already sorted according to the vessel tree. The unsorted node list (USN) initially contains the list of all other region nodes assigned by the node distribution process described in the previous section. Only these other region nodes need to be sorted.

In Step 2, the closest node pair between the sorted and unsorted node lists is found, in terms of the distance $D_{i,j}$ between the i-th sorted node $SN_i$ and j-th unsorted node $USN_j$:

$$[\hat{i}, \hat{j}] = \underset{i,j}{\mathrm{argmin}}\, D_{i,j},$$

$$D_{i,j} = \|position(SN_i) - position(USN_j)\|_2.$$

In Step 3, the closest unsorted node $UEN_j$ is moved from the unsorted node list to the end of the sorted node list. For instance, if the sorted node list currently includes $Node_1$-$Node_{100}$, when handling a closest node pair that consists of $Node_{50}$ in the sorted node list and Node X in the unsorted node list, Node X will be added into the sorted node list as $Node_{101}$.

In Step 4, steps 2 and 3 are repeated, until the unsorted node list is empty. After the sorting operation is complete, in Step 5, given any node $N_m$, if its nearest neighbor (NN) among the nodes prior to $N_m$ on the current list is farther than a predetermined maximum distance threshold, an additional motion node is added to reduce the distance. The position of the new motion node is chosen at a voxel that is as close as possible to the midpoint of the line segment connecting the nodes $N_m$ and NN, and has a $GES_2$ value greater than a threshold. In the sorted node list, this additional motion node is placed just prior to $N_m$. In this way, the spatial distance between a given node and its NN can be kept below the maximum distance threshold.

Step 5 is repeated, until all distances between the NN motion node pairs are less than the maximum distance threshold. Note that if, for the current node $N_m$ whose NN is farther than the maximum distance threshold, a new node that satisfies the above criteria cannot be found, $N_m$ can be skipped and then the process moves to the next node, $N_{m+1}$. This is to avoid adding a new node without a distinctive feature, which is worse than an increased distance between the node $N_m$ and its NN.

V. Motion Estimation

According to embodiments of this application, motion model parameters are estimated at each node using a warm-started gradient descent method. As discussed below, a total cost functional is used, which converts the motion estimation problem into an optimization problem:

$$\hat{M}_j = \underset{M_j}{\mathrm{argmin}}\ \phi_s(M_j) + \gamma_p\phi_p(M_j) + \gamma_{reg}(\gamma_{amp}\phi_{amp}(M_j) +$$
$$\gamma_{ang}\phi_{ang}(M_j) + \gamma_{sima}\phi_{sima}(M_j; M_{j-1}) + \gamma_{simp}\phi_{simp}(M_j; M_{j-1})),$$

where
$M_j$:

$$\text{motion parameters} = (m_j^-, m_j^+, s_j^0)$$

$\phi_x$: volume similarity cost functional
$\phi_p$: volume sharpness cost functional
$\phi_{amp}$: motion amplitude regularizer
$\phi_{ang}$: motion acute angle regularizer
$\phi_{sima}$: motion amplitude similarity regularizer
$\phi_{simp}$: motion angle similarity regularizer
$\gamma_t$: strength parameter of the corresponding component.
j: motion node index The components of the proposed total cost functional can include a volume similarity cost functional, a volume sharpness cost functional, and various regularization terms, such as a motion amplitude regularizer, a motion acute angle regularizer, a motion amplitude similarity regularizer, a motion angle similarity regularizer, etc. The cost functionals and regularization terms will be described below.

A. Volume Similarity Cost Functional $\Phi_s$

When the motion is properly compensated, the short-scan FDK (Feldkamp, Davis and Kress) reconstructed volume in any phase should return the same result, except for errors and artifacts due to the FDK approximation. For example, the SS-0 volume and the SS-1 volume can be compared to determine how accurate the motion model estimation is. This measure of similarity between the SS-0 and SS-1 volumes is called volume similarity, and one of its possible embodiments is given by the equation below:

$$\phi_s(m_j^-, m_j^+, s_j^0) = \frac{1}{N_j}\sum_{i\in j_i}(F_0(x_i : m_j^-, m_j^+, s_j^0) - F_1(x_i; m_j^-, m_j^+, s_j^0))^2,$$

where $F_k$ is the k-th warped short-scan reconstructed volume given by:

$$F_k(x{:}m^-, m^+, s^0) = \sum_{p\in P_k} w_k(x, s_p)f_p(x + \phi(x, s_p; m^-, m^+, s^0)),$$

$N_j$: number of elements in $I_j$
$I_j$: set of voxels within a patch to be used for motion estimation of jth motion node.
i: volume voxel index
$x_i$: 3D spatial coordinate of ith voxel

$s_j^0$:

hinge phase of jth motion node
k: short-scan index, 0 or 1
p: PAR volume index
$s_p$: center phase of pth PAR bin $\mathcal{P}_k$: set of PAR bins within the angular extent of the kth short-scan $w_k$: redundancy weight corresponding to the kth short-scan $f_p$: pth PAR volume $\psi$: displacement relative to the position at reference time B. Volume Sharpness Cost Functional $\Phi_p$ In many cases, images reconstructed from X-ray CT motion contaminated data are less sharp than images reconstructed from X-ray CT data of an object that was not moving (deforming) during the scan; thus, image sharpness is a natural metric to sense motion. However, CT reconstruction of a beating heart can produce not only a blurred image, but also a depression artifact, where the image value is much lower than the background value. This depression contributes to sharpness, creating an undesirable local minimum.

To use the sharpness metric for cardiac CT ME, it is desirable to reject the sharpness increase due to the depression artifact. For example, since the final result is SS-2, the sharpness of SS-2 can be maximized (or minimized, after being multiplied by −1) to estimate motion. The volume sharpness cost functional $\Phi_p$ is represented as:

$$\phi_p(m^-, m^+, s^0) = -\frac{1}{N_i} \sum_i \sum_{j \in J_i}$$

$$\frac{|F_x(x_j; m^-, m^+, s^0) - F_2(x_j; m^-, m^+, s^0)|^4}{(D_{max}(x_j))^2} G(\min(F_2(x_i), F_2(x_j)))$$

where G(t) is a smoothed step function to downweight the sharpness when image intensity is below a threshold.

Figure 10:
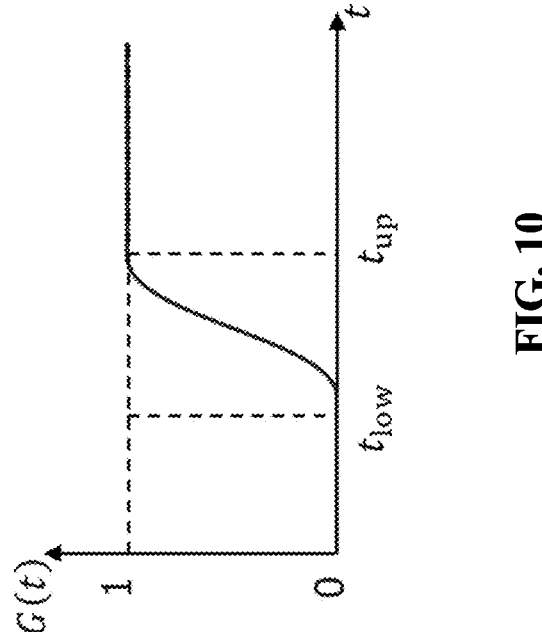
FIG. 10 shows an exemplary graph of a smoothed step function G(t)

FIG. 10 shows an exemplary graph of the smoothed step function G(t). In FIG. 10, $t_{low}(x)$ represents $\max(D_{min}(x)$, median[depression minima]), $t_{up}(x)$ represents $\max(t_{low}(x)+1$, median[fat]). For example, $D_{max}(x)$ is the maximum value in a 51×51×3 voxel circular cylinder with the center at x, $D_{min}(x)$ is the minimum value in the 51×51×3 voxel circular cylinder with the center at x. The voxel values of depression minima and fat can be collected manually from uncompensated reconstructed volumes, e.g., 35 samples taken from 10 randomly selected datasets.

Figures 11A, 11B:
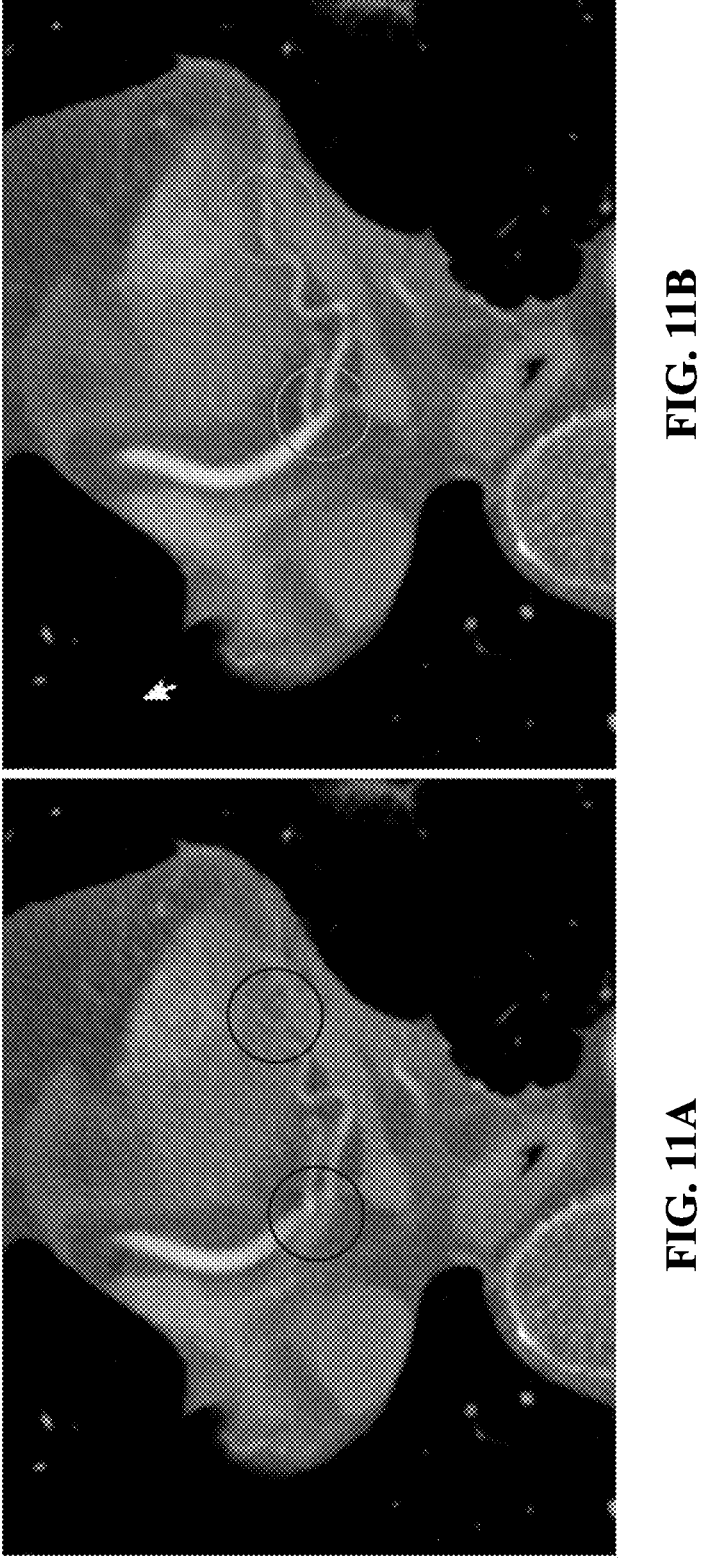
FIGS. 11A and 11B show images without and with the motion compensation, respectively.

As another example, by deep learning, a depression artifact (reconstructed HU values "depressed" due to motion contaminated data) in a neighborhood of the node can be detected, and parameters of the cost functional can be based on the HU values in the vicinity of the node. FIGS. 11A and 11B show images reconstructed without correction and with motion artifacts corrected, respectively. The circles in FIG. 11A indicate artifacts, while the circles in FIG. 11B illustrate elimination of these artifacts.

C. Motion Amplitude Regularization $\Phi_{amp}$

If the data does not specify a unique motion model due to its limited amount of information (for example, for horizontal vessels), the unique solution is chosen by penalizing large motion amplitudes:

$$\phi_{amp} = (\|m_i^-\|_3^3 + \|m_i^+\|_3^3).$$

In this example, $L_3$ norm is used to penalize large motion amplitudes.

D. Motion Acute Angle Regularization $\Phi_\theta$

Figure 12:
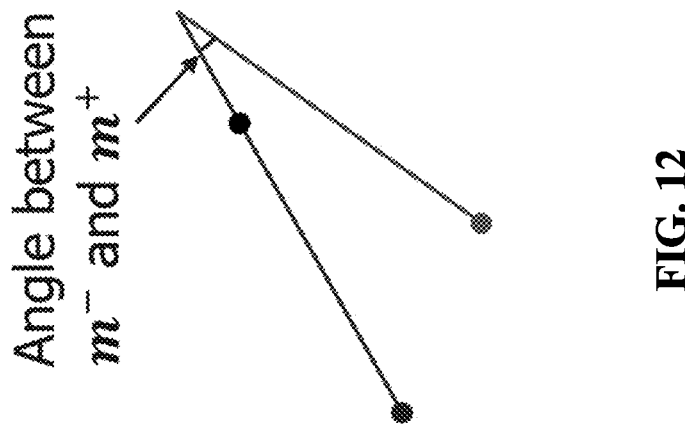
FIG. 12 shows a small angle between displacement vectors m⁻ and m⁺ that is used to characterize the edge pulling effect.

The volume sharpness metric tends to attract a strong, continuous edge toward the center of the patch, if the patch intersects the edge. This edge pulling effect can be characterized by a small angle between displacement vectors $m^-$ and $m^+$, as shown in FIG. 12.

A penalization can be added to the total cost functional to discourage an overly small angle between $m^-$ and $m^+$:

$$\phi_\theta = \frac{\langle m^-, m^+ \rangle}{(\|m^-\| + \epsilon)(\|m^+\| + \epsilon)},$$

where $\langle \cdot, \cdot \rangle$ denotes the inner product.

E. Motion Similarity Regularizations $\Phi_{sima}$ and $\Phi_{simp}$

Figure 13:
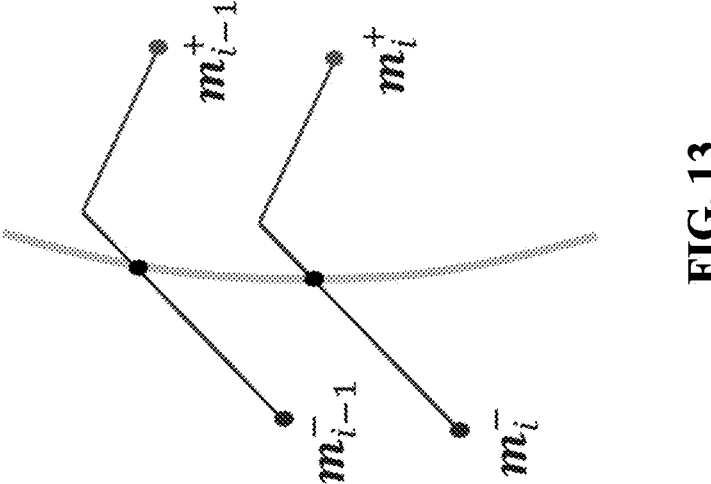
FIG. 13 shows motion parameters at the i-th node and at the (i–1)-th node.

As shown in FIG. 13, motion parameters at the i-th node should be close to those at the (i−1)-th node. Thus, a motion amplitude similarity regularizer and a motion angle similarity regularizer are introduced in the total cost functional:

$$\phi_{sima} = \|m_i^- - m_{i-1}^-\|^2 + \|m_i^+ - m_{i-1}^+\|^2.$$

$$\phi_{simp} = \|s_i^0 - s_{i-1}^0\|^2.$$

F. Adjustment Depending on Orientation of Vessel

It is observed that estimating motion of horizontal vessels is much harder, because the edges of the horizontal vessels are visible from fewer directions in the CT data. To address this issue, in one embodiment of the present application, the artery nodes are further divided depending on the slope of the vessel at each node. Three categories can be obtained by this division, i.e., (1) vertical artery nodes, (2) intermediate artery nodes, and (3) horizontal artery nodes. Different settings for motion estimation will be applied to different categories.

Figure 14:
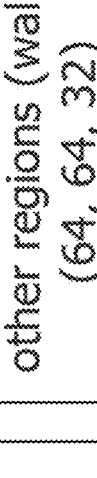
FIG. 14 shows a node-type-based variable patch size scheme.

In order to address motion estimation instability at horizontal arteries, a node-type-based variable patch size scheme can be developed. In this scheme, the slope of the vessel can be estimated based on the vessel tree information. Depending on the estimated slope, the patch size can be increased in a stepwise manner. That is, when a small feature (e.g., a vertical artery) provides enough motion information, a smaller patch can be used for motion estimation. In contrast, for horizontal arteries or other regions, a bigger patch can be used to improve robustness of motion estimation by considering more features. For example, as shown in FIG. 14, a 24×24×16 patch size can be used for a vertical artery, a 53×53×26 patch size can be used for a horizontal artery, and a 64×64×32 patch size can be used for nodes in other regions (e.g., a heart wall).

Moreover, because motion estimation of a horizontal artery can be less stable than that of a vertical artery, it requires stronger regularization to make motion estimation more robust. However, the regularization strength cannot be increased globally, as it will cause motion underestimation.

According to one embodiment of this application, an additional factor $\gamma_{reg}$ is introduced to control the regularization strength depending on the vulnerability of each node type to motion estimation instability. As shown in the table below, a different $\gamma_{reg}$ can be applied to a different node type.

| Node Type | $\gamma_{reg}$ |
| --- | --- |
| Vertical vessels | 1× |
| Intermediate vessels | 5× |

-continued

| Node Type | $\gamma_{reg}$ |
|---|---|
| Horizontal vessels | 9× |
| Other regions | 1× |

G. Node Position Optimization

While the motion acute angle regularization described above helps to reduce edge pulling, it could not eliminate the edge pulling effect completely. To further avoid edge pulling, prior to performing motion estimation, the node position can be shifted to a nearby location where the sharpness metric attains a local maximum.

The new patch center should not be too far from the original center, so that it does not lose the artery or introduce motion that is far from the original node position. The patch size is also increased accordingly, so that no important features will be lost. Then, motion estimation is performed based on the optimized patch. Since the patch is optimized to have the maximum sharpness metric initially, no other edge will be attracted during motion estimation.

For example, the node (center of the patch) can be moved in the direction where the volume sharpness of the uncorrected image increases within the patch. In an embodiment of the application, pattern search and coordinate descent can be combined. In each step, the sharpness cost functional of the uncorrected SS-2 is compared after shifting the patch by ±1 voxel along x, y, and then z axes. The direction where the sharpness metric becomes maximum (or minimum with the negative sign) is followed. Such operations are repeated until the sharpness metric does not grow significantly (e.g., by over 5%) in any direction, or after performing a predefined number of iterations (e.g., five iterations).

Figure 15:
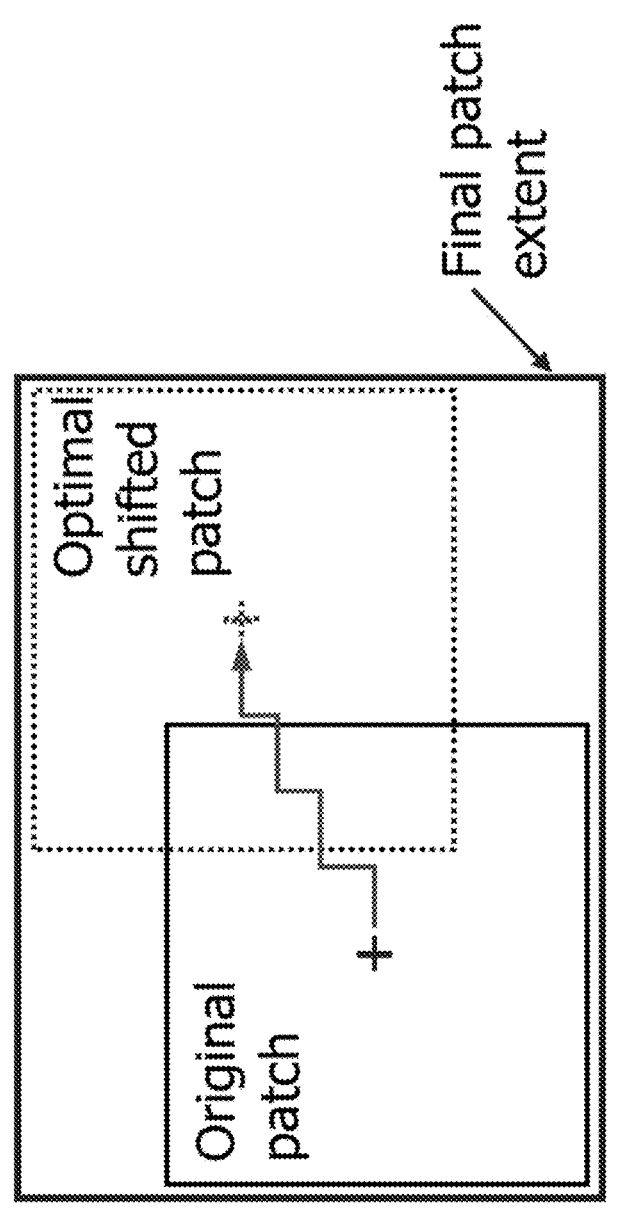
FIG. 15 shows an extended patch that covers both the original patch and the optimal shifted patch.

In an example, movement of the node is restricted to be no more than 5 voxels in any direction. Once the optimal node position is found, the patch size can be increased to include both the original patch and the optimal shifted patch, as shown in FIG. 15. With the extended patch size, no features in the original patch will be lost.

VI. Global Motion Model

Once all motion parameters at every motion node are estimated, those values can be used to estimate the motion at every voxel position of the volume.

As motion nodes are distributed in an irregular fashion throughout the heart, an interpolation method is applied to the scattered data. In an embodiment of the application, the modified Shepard inverse distance weight method can be adopted due to its simplicity. Note that this is not restrictive, because there are many other interpolation methods available as well.

The Modified Shepard inverse distance method uses data at the neighbors, i.e., within the distance of $R_{max}$ (for example, within 75 voxels) from the query point, and averages it with a weight W. For example, the weight W can be a function of the Euclidean distance $d(x_i, y_k)$ between the neighbor data point $y_k$ and the query point $x_i$:

$$\hat{t}_i = \frac{\sum_k W_m(i, k) t_k}{\sum_k W_m(i, k)},$$

-continued $$W_m(i, k) = \left( \frac{\max(0, R_{max} - d(x_i, y_k))}{R_{max} d(x_i, y_k)} \right)^2,$$

where $t_k$ represents any motion parameter $$\left( m_j^-, m_j^+, s_j^0 \right)$$

of the k-th motion node, and it is the interpolated value at the query point $x_i$.

It is undesirable for the motion to be discontinuous at the boundary of the $R_{max}$-radius sphere. To smoothly attenuate the motion, the interpolated motion values are multiplied by a mollifier $W_{moll}$. For example, the mollifier $W_{moll}$ can be a trapezoidal function of distance $d(x_i, y_k)$. An exemplary mollifier is shown in FIG. 16.

VII. Motion Compensation

The global motion model obtained based on the interpolated motion parameters is applied to each voxel of each PAR volume. The values are added together to reconstruct a motion-compensated SS-2 centered at the reference phase.

Alternatively, instead of the BWA method, the MC-FDK approach can be used with the estimated global motion model to enhance the temporal resolution of the final reconstruction. This can lead to better image quality with slightly longer computational time.

Figure 17:
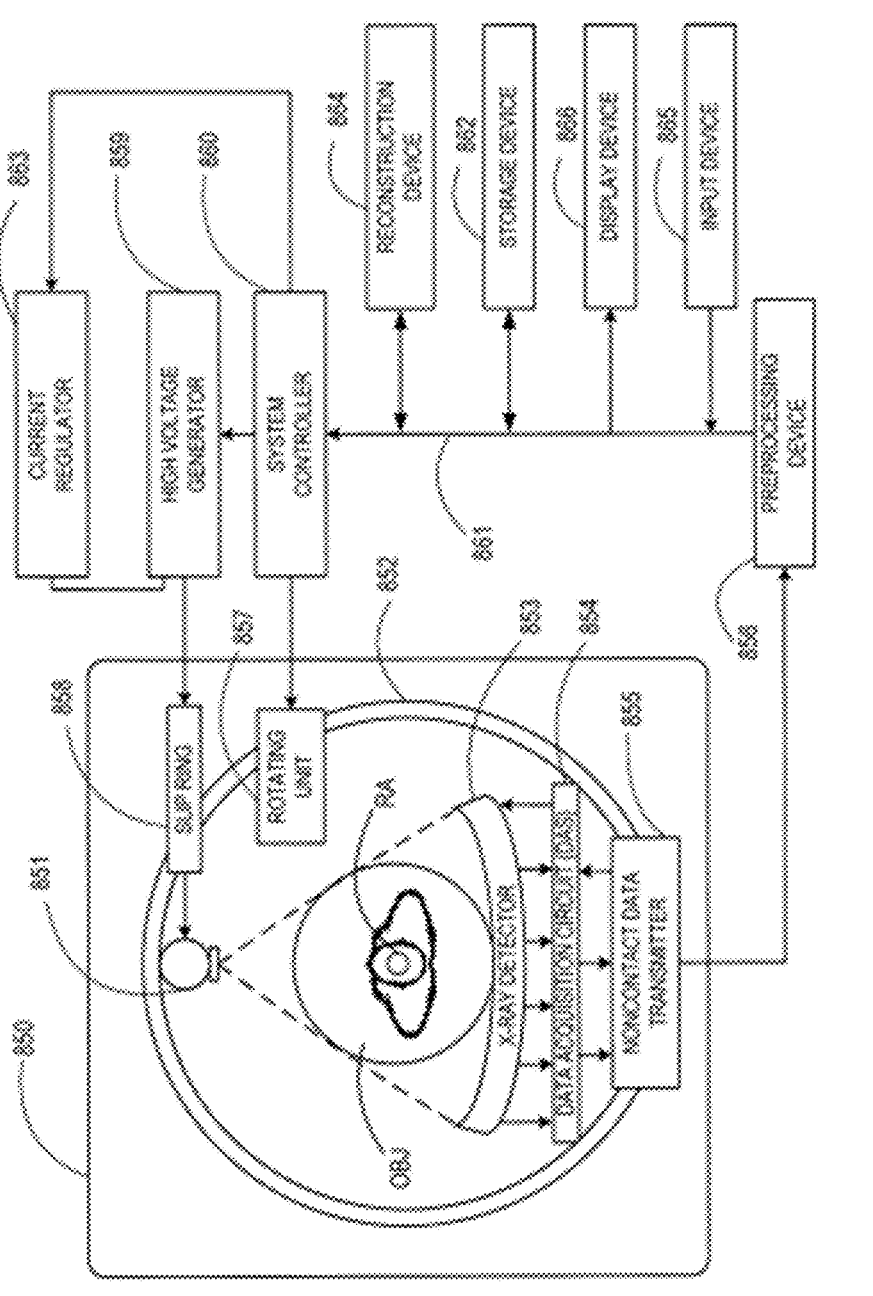
FIG. 17 illustrates an implementation of a CT system.

FIG. 17 illustrates an implementation of a CT system or scanner. As shown in FIG. 17, a radiography gantry 850 is illustrated from a side view and further includes an X-ray tube 851, an annular frame 852, and a multi-row or two-dimensional-array-type X-ray detector 853. The X-ray tube 851 and X-ray detector 853 are diametrically mounted across an object OBJ on the annular frame 852, which is rotatably supported around a rotation axis RA. A rotating unit 857 rotates the annular frame 852 at a high speed, such as 0.4 sec/rotation, while the object OBJ is being moved along the axis RA into or out of the illustrated page.

An embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate-type, which is currently the mainstream, will be exemplified.

The multi-slice X-ray CT apparatus further includes a high voltage generator 859 that generates a tube voltage applied to the X-ray tube 851 through a slip ring 858 so that the X-ray tube 851 generates X-rays. The X-rays are emitted towards the object OBJ, whose cross-sectional area is represented by a circle. For example, the X-ray tube 851 having an average X-ray energy during a first scan that is less than an average X-ray energy during a second scan. Thus, two or more scans can be obtained corresponding to different X-ray energies. The X-ray detector 853 is located at an opposite side from the X-ray tube 851 across the object OBJ for detecting the emitted X-rays that have transmitted through the object OBJ. The X-ray detector 853 further includes individual detector elements or units.

The CT apparatus further includes other devices for processing the detected signals from the X-ray detector 853. A data acquisition circuit or a Data Acquisition System (DAS) 854 converts a signal output from the X-ray detector 853 for each channel into a voltage signal, amplifies the signal, and further converts the signal into a digital signal. The X-ray detector 853 and the DAS 854 are configured to handle a predetermined total number of projections per rotation (TPPR).

The above-described data is sent to a preprocessing device 856, which is housed in a console outside the radiography gantry 850 through a non-contact data transmitter 855. The preprocessing device 856 performs certain corrections, such as sensitivity correction, on the raw data. A memory 862 stores the resultant data, which is also called projection data at a stage immediately before reconstruction processing. The memory 862 is connected to a system controller 860 through a data/control bus 861, together with a reconstruction device 864, input device 865, and display 866. The system controller 860 controls a current regulator 863 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 851 and the X-ray detector 853 are diametrically mounted on the annular frame 852 and are rotated around the object OBJ as the annular frame 852 is rotated about the rotation axis RA. In the fourth-generation geometry system, the detectors are fixedly placed around the patient and an X-ray tube rotates around the patient. In an alternative embodiment, the radiography gantry 850 has multiple detectors arranged on the annular frame 852, which is supported by a C-arm and a stand.

The memory 862 can store the measurement value representative of the irradiance of the X-rays at the X-ray detector unit 853. Further, the memory 862 can store a dedicated program for executing the CT image reconstruction, material decomposition, and motion estimation and motion compensation methods including the methods described herein.

The reconstruction device 864 can execute the above-referenced methods, described herein. Further, reconstruction device 864 can execute pre-reconstruction processing image processing such as volume rendering processing and image difference processing as needed.

The pre-reconstruction processing of the projection data performed by the preprocessing device 856 can include correcting for detector calibrations, detector nonlinearities, and polar effects, for example.

Post-reconstruction processing performed by the reconstruction device 864 can include filtering and smoothing the image, volume rendering processing, and image difference processing, as needed. The image reconstruction process can be performed using filtered back projection, iterative image reconstruction methods, or stochastic image reconstruction methods. The reconstruction device 864 can use the memory to store, e.g., projection data, reconstructed images, calibration data and parameters, and computer programs.

The reconstruction device 864 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VDHL, Verilog, or any other hardware description language and the code may be stored in an electronic memory directly within the FPGA or CPLD, or as a separate electronic memory. Further, the memory 862 can be non-volatile, such as ROM, EPROM, EEPROM or FLASH memory. The memory 862 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 864 can execute a computer program including a set of computer-readable instructions that perform the functions described herein, the program being stored in any of the above-described non-transitory electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft 10, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 866. The display 866 can be an LCD display, CRT display, plasma display, OLED, LED or any other display known in the art.

The memory 862 can be a hard disk drive, CD-ROM drive, DVD drive, FLASH drive, RAM, ROM or any other electronic storage known in the art.

The inventions are not limited to the examples that have just been described; it is in particular possible to combine features of the illustrated examples with one another in variants that have not been illustrated.

The invention claimed is:

1. A method for motion estimation in a CT system, comprising:
   dividing projection data, obtained by scanning a heart using the CT system, into a plurality of partial-angle-reconstruction (PAR) bins;
   reconstructing a plurality of PAR volumes from the PAR-binned projection data;
   obtaining, based on the plurality of reconstructed PAR volumes, a number of short-scan volumes;
   determining, based on the obtained number of short-scan volumes, a plurality of nodes throughout the heart;
   estimating, for each of the determined plurality of nodes, a plurality of model parameters of a motion model; and
   generating, based on the plurality of model parameters estimated for each of the plurality of nodes, parameters of a global motion model at each voxel of a volume of the heart.

2. The method of claim 1, further comprising:
   reconstructing, based on the generated motion parameters of the global motion model at each voxel of the volume of the heart, a motion-compensated short-scan volume.

3. The method of claim 1, wherein the determining step further comprises:
   determining, based on the obtained number of short-scan volumes and additional information, the plurality of nodes throughout the heart, wherein

17

18 the additional information includes a segmented coronary artery tree.

4. The method of claim 3, wherein the determining step further comprises:

determining, based on the obtained number of short-scan volumes and the additional information, a plurality of artery nodes, a starting node, and a plurality of other region nodes throughout the heart, wherein the plurality of artery nodes are distributed along the segmented coronary artery tree, the starting node is determined to be located in an anatomical area known to have motion less than a threshold, and the plurality of other region nodes are distributed based on a comparison of the number of short-scan volumes.

5. The method of claim 4, wherein the determining step further comprises:

creating a node sequence including the plurality of artery nodes, the starting node, and the plurality of other region nodes, by placing the starting node at a first slot of the node sequence, and sorting the plurality of other region nodes such that consecutive nodes in the node sequence are close to each other spatially.

6. The method of claim 3, wherein the additional information further includes a heart mask such that the plurality of node are determined to be only inside the heart.

7. The method of claim 1, wherein the number of short-scan volumes include a first short-scan volume, a second short-scan volume, and a reference short-scan volume;

the reference short-scan volume is centered at a reference phase where motion is assumed to be minimal;

both the first short-scan volume and the second short-scan volume are centered away from the reference phase; and the estimating step further comprises, for each of the plurality of nodes, determining the plurality of model parameters of the motion model so as to maximize a cost functional that includes a similarity between the first short-scan volume corrected with the motion model and the second short-scan volume corrected with the motion model.

8. The method of claim 1, wherein the cost functional further includes a sharpness term that is adjusted based on whether a depressed Hounsfield Unit value is identified as contributing to a sharpness measurement of the reference short-scan volume.

9. The method of claim 1, wherein the estimating step further comprises estimating, for each of the plurality of nodes, the plurality of model parameters of the motion model, which are determined by analyzing a local volume around the node, and a size of the local volume is determined based on an orientation of a blood vessel where the node is located.

10. The method of claim 1, wherein the estimating step further comprises, for each of the plurality of nodes:

estimating the plurality of model parameters of the motion model, which are determined by analyzing a local volume around the node, and upon detection, in a vicinity of the node, of a feature that has a larger sharpness measurement than the node, moving the node to a position of the detected feature, and updating the local volume to cover both the origi-nal local volume around the initial node and a local volume around the detected feature.

11. The method of claim 1, wherein the dividing step further comprises:

dividing the projection data into the plurality of PAR bins, wherein every pair of adjacent PAR bins has an overlap represented by a partition-of-unity weight.

12. An apparatus for motion estimation in a CT system, the apparatus comprising: processing circuitry configured to divide projection data, obtained by scanning a heart using the CT system, into a plurality of partial-angle-recon-struction (PAR) bins;

reconstruct a plurality of PAR volumes from the PAR-binned projection data;

obtain, based on the plurality of reconstructed PAR vol-umes, a number of short-scan volumes;

determine, based on the obtained number of short-scan volumes, a plurality of nodes throughout the heart;

estimate, for each of the determined plurality of nodes, a plurality of model parameters of a motion model; and generate, based on the plurality of model parameters estimated for each of the plurality of nodes, parameters of a global motion model at each voxel of a volume of the heart.

13. The apparatus of claim 12, where the processing circuitry is further configured to:

reconstruct, based on the generated motion parameters of the global motion model at each voxel of the volume of the heart, a motion-compensated short-scan volume.

14. A non-transitory computer-readable medium storing a program that, when executed by processing circuitry, causes the processing circuitry to execute a method for motion estimation in a CT system, the method comprising:

dividing projection data, obtained by scanning a heart using the CT system, into a plurality of partial-angle-reconstruction (PAR) bins;

reconstructing a plurality of PAR volumes from the PAR-binned projection data;

obtaining, based on the plurality of reconstructed PAR volumes, a number of short-scan volumes;

determining, based on the obtained number of short-scan volumes, a plurality of nodes throughout the heart;

estimating, for each of the determined plurality of nodes, a plurality of model parameters of a motion model; and generating, based on the plurality of model parameters estimated for each of the plurality of nodes, parameters of a global motion model at each voxel of a volume of the heart.

15. The non-transitory computer-readable medium of claim 14, wherein the method further comprises:

reconstructing, based on the generated motion parameters of the global motion model at each voxel of the volume of the heart, a motion-compensated short-scan volume.

16. The method of claim 1, wherein the determining step further comprises determining, by analyzing features in the obtained number of short-scan volumes, the plurality of nodes throughout the heart; and the estimating step further comprises estimating, for each of the determined plurality of nodes, by analyzing the features in the obtained number of short-scan volumes in a neighborhood of each node, a plurality of model parameters of a motion model of that node.

* * * * *